US009497433B2

United States Patent
Noda (10) Patent No.: US 9,497,433 B2
(45) Date of Patent: Nov. 15, 2016

(54) IMAGING DEVICE WITH COLOR ADJUSTMENT FUNCTION, IMAGING METHOD USING THE SAME, AND NON-TRANSITORY STORAGE MEDIUM IN WHICH IMAGING PROGRAM IS STORED

(71) Applicant: OLYMPUS CORPORATION, Hachioji-shi, Tokyo (JP)

(72) Inventor: Masatoshi Noda, Hachioji (JP)

(73) Assignee: OLYMPUS CORPORATION (JP)

( * ) Notice: Subject to any disclaimer, the term of this patent is extended or adjusted under 35 U.S.C. 154(b) by 32 days.

(21) Appl. No.: 14/340,147

(22) Filed: Jul. 24, 2014

(65) Prior Publication Data

US 2015/0029356 A1    Jan. 29, 2015

(30) Foreign Application Priority Data

Jul. 25, 2013 (JP) ................................. 2013-154413

(51) Int. Cl.
  *H04N 9/73* (2006.01)
  *H04N 5/235* (2006.01)
  *H04N 9/64* (2006.01)

(52) U.S. Cl.
  CPC ............ *H04N 9/735* (2013.01); *H04N 5/2353* (2013.01); *H04N 5/2354* (2013.01); *H04N 9/643* (2013.01)

(58) Field of Classification Search
  CPC .... H04N 9/735; H04N 9/643; H04N 5/2354; H04N 5/2353
  See application file for complete search history.

(56) References Cited

U.S. PATENT DOCUMENTS

| | | | | |
|---|---|---|---|---|
| 2008/0111789 | A1* | 5/2008 | Young | G06K 9/22 345/157 |
| 2011/0228074 | A1* | 9/2011 | Parulski | G03B 15/05 348/81 |
| 2013/0083237 | A1* | 4/2013 | Satou | H04N 5/2351 348/362 |

FOREIGN PATENT DOCUMENTS

JP        09-236839        9/1997

* cited by examiner

*Primary Examiner* — Ahmed A Berhan
*Assistant Examiner* — Padma Haliyur
(74) *Attorney, Agent, or Firm* — Volpe and Koenig, P.C.

(57) ABSTRACT

An imaging device includes an imaging section, a main subject detecting section, a main subject color determining section, a background color setting section, an exposure control section, and a photography control section. The imaging section images a subject. The main subject detecting section detects a region of a main subject in image data. The main subject color determining section determines a color of the region of the main subject. The background color setting section sets a color of a region that becomes a background of the region of the main subject. The exposure control section sets an exposure setting value in accordance with the color of the region that becomes the background. The photography control section controls main imaging in accordance with the exposure setting value.

3 Claims, 8 Drawing Sheets

IMAGING DEVICE WITH COLOR ADJUSTMENT FUNCTION, IMAGING METHOD USING THE SAME, AND NON-TRANSITORY STORAGE MEDIUM IN WHICH IMAGING PROGRAM IS STORED

CROSS-REFERENCE TO RELATED APPLICATIONS

This application is based upon and claims the benefit of priority from the prior Japanese Patent Application No. 2013-154413, filed Jul. 25, 2013, the entire contents of which are incorporated herein by reference.

BACKGROUND OF THE INVENTION

1. Field of the Invention

The present invention relates to an imaging device, an imaging method and a non-transitory storage medium in which an imaging program is stored.

2. Description of the Related Art

Heretofore, various suggestions have been made to inhibit color fogging during photography. Color fogging is a phenomenon in which a main subject is colored in a specific color under an influence of background light during photography. For example, in Jpn. Pat. Appln. KOKAI Publication No. H09-236839, a camera has been suggested in which exposure control and dimming control are executed to obtain an optimum color balance between the background light and flashlight, so that it is possible to photograph an image in which a background color is also brightly reflected while inhibiting color fogging of the main subject. In the camera of Jpn. Pat. Appln. KOKAI Publication No. H09-236839, when the background light includes a lot of green (e.g., in the case of photography under a fluorescent lamp), a dimming level is increased while keeping the background underexposed, and when the background light includes a lot of red (e.g., in the case of photography of an evening scene), the dimming level is lowered while keeping the background overexposed. Furthermore, when the background light includes a lot of blue, the dimming level is lowered while keeping the background underexposed, whereby the color balance between the main subject and the background light is adjusted.

BRIEF SUMMARY OF THE INVENTION

According to a first aspect of the invention, an imaging device comprises: an imaging section which images a subject to obtain image data; a main subject detecting section which detects a region of a main subject in the image data; a main subject color determining section which determines a color of the region of the main subject; a background color setting section which sets a color of a region that becomes a background of the region of the main subject; an exposure control section which sets an exposure setting value in accordance with the color of the region that becomes the background; and a photography control section which controls main imaging by the imaging section in accordance with the exposure setting value.

According to a second aspect of the invention, an imaging method comprises: imaging a subject by an imaging section to obtain image data; detecting a region of a main subject in the image data; determining a color of the region of the main subject; setting a color of a region that becomes a background of the region of the main subject; setting an exposure setting value in accordance with the color of the region that becomes the background; and controlling main imaging by the imaging section in accordance with the exposure setting value.

According to a third aspect of the invention, a non-transitory storage medium stores an imaging program. The imaging program allows a computer to execute: imaging a subject by an imaging section to obtain image data; detecting a region of a main subject in the image data; determining a color of the region of the main subject; setting a color of a region that becomes a background of the region of the main subject; setting an exposure setting value in accordance with the color of the region that becomes the background; and controlling main imaging by the imaging section in accordance with the exposure setting value.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of the present invention will be described with reference to the drawings.

Figure 1:
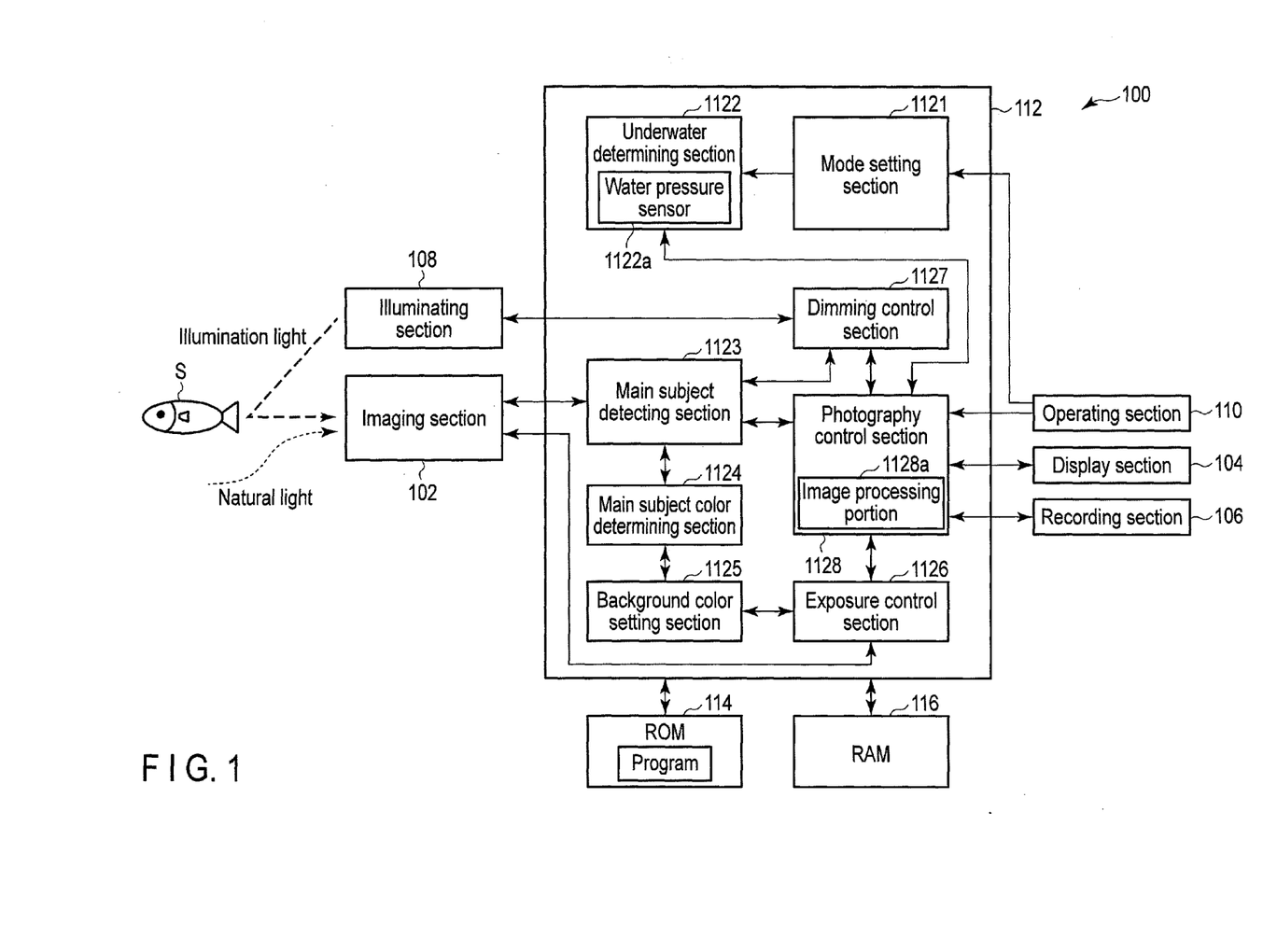
FIG. 1 is a block diagram of one example of an imaging device according to one embodiment of the present invention.

FIG. 1 is a block diagram of one example of an imaging device according to one embodiment of the present invention. As shown in FIG. 1, an imaging device 100 includes an imaging section 102, a display section 104, a recording section 106, an illuminating section 108, an operating section 110, a control unit 112, a ROM 114, and a RAM 116.

The imaging section 102 has a photography optical system, an imaging element, an A/D conversion circuit and the like, and images a subject S to acquire image data. The photography optical system includes a single optical system or a plurality of optical systems to condense a luminous flux from the subject S onto the imaging element. The photography optical system may include a zoom lens or a focus lens. The imaging element converts the luminous flux that has entered via the photography optical system into an electric signal (referred to as an image signal) corresponding to an amount of light to be received. The A/D conversion circuit converts the image signal, which is an analog electric signal obtained by the imaging element, into image data, which is a digital electric signal.

The display section 104 is, for example, a liquid crystal display or an organic EL display, and displays various images on the basis of the image data. The recording section 106 is, for example, a memory card, and records an image file. The image file is a file constituted by adding a predetermined header to the image data.

The illuminating section 108 is, for example, a flash device, and emits illumination light to illuminate the subject S. The illuminating section 108 may be an LED light source or the like. Furthermore, the illuminating section 108 may be an external illumination light source detachably attached to the imaging device 100.

The operating section 110 is an operation member for a user to perform various operations of the imaging device 100. The operating section 110 includes a release button, a menu button and the like. The release button is an operation member for the user to instruct the imaging device 100 to execute a photographing operation. The menu button is an operation member for the user to instruct the imaging device 100 to display a menu screen for performing various settings. Here, part of the operation members of the operating section 110 may be constituted of a software-like operation member in which a touch panel is used.

The control unit 112 is constituted of, for example, a CPU, and controls the whole operation of the imaging device 100. The control unit 112 has a mode setting section 1121, an underwater determining section 1122, a main subject detecting section 1123, a main subject color determining section 1124, a background color setting section 1125, an exposure control section 1126, a dimming control section 1127, and a photography control section 1128. The mode setting section 1121, the underwater determining section 1122, the main subject detecting section 1123, the main subject color determining section 1124, the background color setting section 1125, the exposure control section 1126, the dimming control section 1127 and the photography control section 1128 may be constituted of hardware or software.

The mode setting section 1121 receives the operation of the operating section 110 by the user to set an operation mode of the imaging device 100. The imaging device in the present embodiment has a usual photography mode and an underwater photography mode as the operation modes. Furthermore, the underwater photography mode has a blue background/black background automatic determination priority mode, a blue background priority mode, and a black background priority mode. The underwater photography mode will be described later in detail. The underwater judging section 1122 determines whether or not the present state of the imaging device 100 is a state of underwater photography. The underwater photography state is determined from, for example, the operation mode set in the mode setting section 1121 or an output of a water pressure sensor 1122a.

The main subject detecting section 1123 detects a region of a main subject in the image data acquired by the imaging section 102. The main subject color determining section 1124 determines a color of the main subject detected by the main subject detecting section 1123. The background color setting section 1125 sets a color of a background during the photography on the basis of the color of the main subject which is determined by the main subject color determining section 1124. The background is, for example, a region other than the main subject in an angle of view.

The exposure control section 1126 controls the photographing operation of the imaging section 102 in accordance with the control by the photography control section 1128 so that the color of the background turns to the color determined by the background color setting section 1125. The dimming control section 1127 controls a light emitting operation of the illuminating section 108 in accordance with the control by the photography control section 1128. Furthermore, the dimming control section 1127 determines an amount of light to be emitted (a dimming level) by the illuminating section 108 during main light emission, on the basis of the result of a preliminary light emission of the illuminating section 108.

The photography control section 1128 receives the operation of the release button of the operating section 110 to control the exposure control section 1126 and the dimming control section 1127, thereby controlling the photographing operation of the imaging device 100. Furthermore, the photography control section 1128 has an image processing portion 1128a. The image processing portion 1128a receives the image data acquired by the imaging section 102 via the main subject detecting section 1123, and subjects the received image data to image processing required for display or recording. This image processing is white balance correction, luminance characteristic conversion or the like. Furthermore, the photography control section 1128 allows the display section 104 to display an image on the basis of the image data subjected to the image processing by the image processing portion 1128a, or prepares the image file from the image data subjected to the image processing by the image processing portion 1128a to record the image file in the recording section 106.

The ROM 114 is, for example, a flash memory, and stores a program required for each type of control of the control unit 112 and various regulation values of the imaging device 100. The RAM 116 is a working memory in which data generated during each type of processing of the control unit 112 is temporarily stored.

Figure 2:
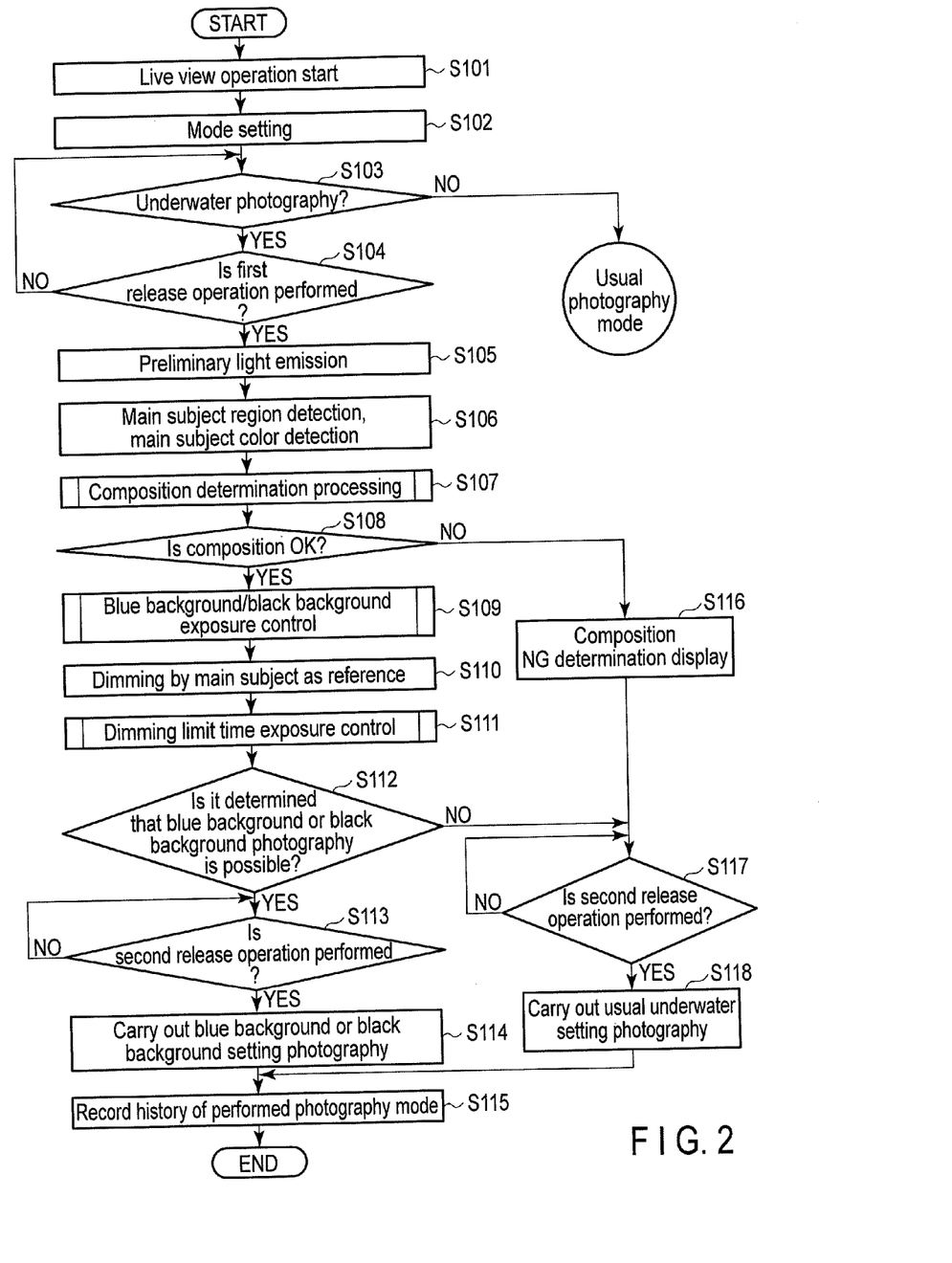
FIG. 2 is a flowchart showing a main operation of the imaging device.

Next, an operation of the imaging device 100 according to the present embodiment will be described. FIG. 2 is a flowchart showing a main operation of the imaging device 100. The operation of the flowchart of FIG. 2 starts after a power source of the imaging device 100 is turned on. At this time, the photography control section 1128 starts a live view operation (step S101). In the live view operation, the photography control section 1128 successively displays, in the display section 104, the image on the basis of the image data obtained by a continuous operation of the imaging section 102. Subsequently, the mode setting section 1121 sets the operation mode of the imaging device 100 (step S102). The operation mode immediately after the power source is turned on is, for example, the usual photography mode. The user operates the operating section 110 to change the operation mode as needed. Furthermore, when the operation mode is set to the underwater photography mode, the user selects a mode of the underwater photography mode from the blue background/black background automatic determination priority mode, the blue background priority mode, and the black background priority mode. Upon receiving the operation of the operating section 110, the mode setting section 1121 changes the setting of the operation mode of the imaging device 100. After the operation mode is set by the mode setting section 1121, the underwater determination section 1122 determines whether or not the present state is a state of underwater photography (step S103). When the operation mode is set to the underwater photography mode in the mode setting section 1121 or when a predetermined water pressure or more is detected by the water pressure sensor 1122a, it is determined that the present state is the underwater photography state. When the water pressure sensor 1122a determines whether or not the mode is the underwater photography mode, a water depth can be calculated from the water pressure detected by the water pressure sensor 1122a. In general, at a water depth of about 3 m, natural light results in an original color of the subject being reflected. On the other hand, when the water depth is in excess of 3 m, blue fogging of the subject easily occurs. Blue fogging is a phenomenon in which natural light does not reach the subject and hence the subject becomes bluish. To inhibit such blue fogging, later-mentioned blue background photography or black background photography is carried out. When it is determined by the water pressure whether or not the present state is the underwater photography state, it is determined that the photography at a water depth of such a degree that the blue fogging can occur is in the underwater photography state.

When it is determined in the step S103 that the present state is not the underwater photography state, the underwater determining section 1122 inputs, into the photography control section 1128, information indicating that the present state is not the underwater photography state. Upon receiving the input of the information indicating that the present state is not the underwater photography state, the photography control section 1128 executes an operation of the usual photography mode. The operation of the usual photography mode is similar to a conventional photography operation, and is therefore only briefly described. That is, in the usual photography mode, when the user performs a first release operation, the exposure control is executed to set an exposure setting value (an aperture value Av and a shutter speed Tv) required so that the exposure of the main subject region is set to a predetermined appropriate value in the imaging device 100. Afterward, when the user performs a second release operation, the photographing operation is performed by the imaging section 102, and the image data obtained as the result of the photographing operation is processed by the image processing portion 1128a. Then, the image file is generated from the image data obtained by the image processing, and this image file is recorded in the recording section 106. It is to be noted that the first release operation is, for example, an operation of pressing the release button half way. The second release operation is, for example, an operation of fully pressing the release button.

When it is determined in the step S103 that the present state is the underwater photography state, the underwater determining section 1122 inputs, into the photography control section 1128, information indicating that the present state is the underwater photography state. Upon receiving the input of the information indicating that the present state is the underwater photography state, the photography control section 1128 executes an operation of the underwater photography mode. First, the photography control section 1128 determines whether or not the first release operation is performed by the user (step S104). When it is determined in the step S104 that the first release operation is not performed, the processing returns to the step S103. In this case, it is determined again whether or not the photography is the underwater photography.

When it is determined in the step S104 that the first release operation is performed, the photography control section 1128 sends an instruction to the dimming control section 1127 so that the illuminating section 108 preliminarily emits the light. Upon receiving this instruction, the dimming control section 1127 allows the illuminating section 108 to preliminarily emit the light at, for example, a predetermined amount of the light to be emitted (dimming level) for the preliminary light emission (step S105). Here, during the preliminary light emission in the step S105, the image data obtained by the imaging section 102 during the preliminary light emission and the image data obtained by the imaging section 102 by the live view operation immediately before the preliminary light emission are previously stored in the RAM 116.

Figure 3:
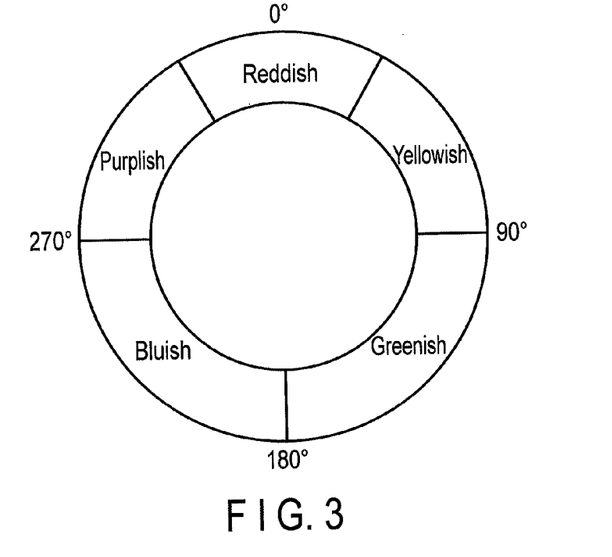
FIG. 3 is a diagram simulating a hue circle.

After the preliminary light emission, the main subject detecting section 1123 detects the region of the main subject in the image data obtained by the imaging section 102 during the preliminary light emission. The main subject herein is, for example, a fish. As a technique of detecting the main subject, for example, template matching can be used. Needless to say, the region of the main subject is detectable by using various detection techniques other than template matching. After the detection of the region of the main subject, the main subject color determining section 1124 determines the color (hue) of the main subject region (step S106). In the present embodiment, the colors of the main subject region are classified into five types: a reddish color, a yellowish color, a greenish color, a bluish color, and a purplish color. FIG. 3 is a diagram simulating a hue circle. In the present embodiment, the reddish color is defined as, for example, a color of regions from 0° to 30° and from 331° to 359° in the hue circle shown in FIG. 3. Similarly, the yellowish color is defined as a color of a region from 31° to 90° in the hue circle shown in FIG. 3, the greenish color is defined as a color of a region from 91° to 180° in the hue circle shown in FIG. 3, the bluish color is defined as a color of a region from 181° to 270° in the hue circle shown in FIG. 3, and the purplish color is defined as a color of a region from 271° to 330° in the hue circle shown in FIG. 3. Here, in the example of FIG. 3, the colors of the main subject region are classified into the five types, but the number of the classified colors is not limited to five. For example, the number of the classified colors may be large, in which the colors include a red color, a reddish orange color, a yellowish orange color, a yellow color, a yellow green color, a green color, a blue green color, a greenish blue color, a blue color, a blue purple color, a purple color, and a red purple color. Furthermore, the color of the main subject region does not have to be defined by the hue, but may be defined by, for example, a wavelength or an RGB ratio. When the color is defined by the wavelength, for example, it may be defined that a color of 400 to 435 [nm] is the purple color, a color of 435 to 480 [nm] is the blue color, a color of 480 to 490 [nm] is the greenish blue color, a color of 490 to 500 [nm] is a bluish green color, a color of 500 to 560 [nm] is the green color, a color of 560 to 580 [nm] is the yellow green color, a color of 580 to 595 [nm] is the yellow color, a color of 595 to 610 [nm] is an orange color, a color of 610 to 750 [nm] is the red color, and a color of 750 to 800 [nm] is the red purple color. Furthermore, when the color is defined by the RGB ratio, for example, it may be defined that a color of $R/G \geq 2$ and $R/B \geq 2$ is the reddish color, a color of $G/R \geq 2$ and $G/B \geq 2$ is the greenish color, a color of $B/R \geq 2$ and $B/G \geq 2$ is the bluish color, a color of ½≤R/G≤2 and R/B≥2 is the yellowish color, and a color of R/G≥2 and ½≤R/B≤2 is the purplish color.

After the color of the main subject region is determined, the background color setting section 1125 sets a color of a background region in accordance with the color of the main subject region. For this purpose, the background color setting section 1125 performs composition determination processing (step S107). Hereinafter, the composition determination processing will be described in detail.

Figure 4:
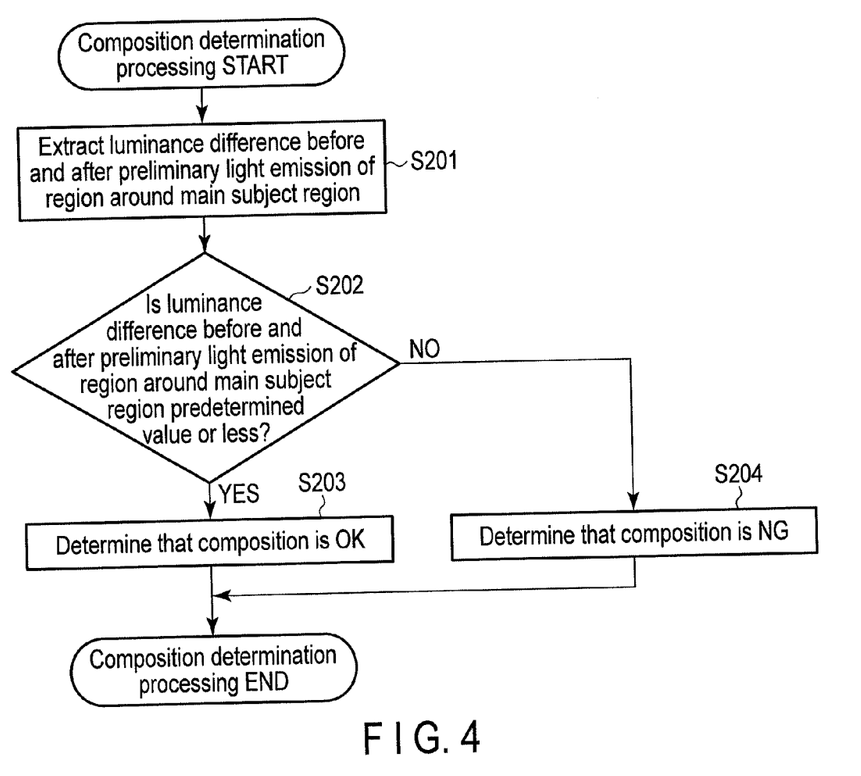
FIG. 4 is a flowchart showing composition determination processing.
Figure 5A:
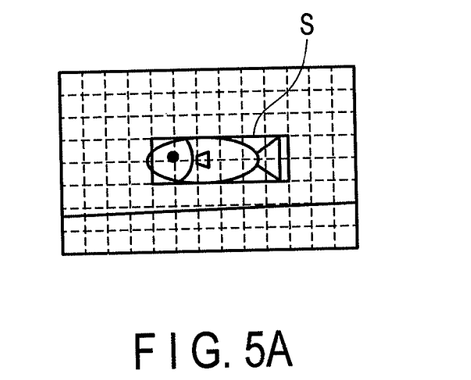
FIG. 5A is a view showing an example of a state where a composition is OK.
Figure 5B:
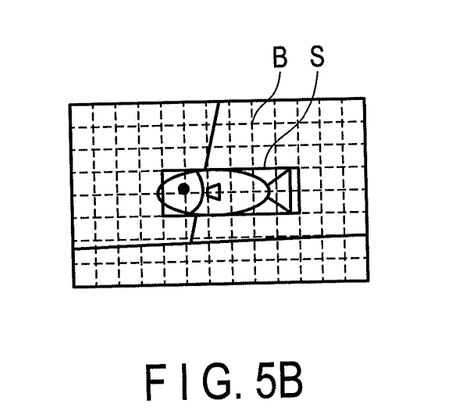
FIG. 5B is a view showing an example of a state where the composition is NG.

FIG. 4 is a flowchart showing the composition determination processing. In FIG. 4, the background color setting section 1125 extracts a difference between a luminance before the preliminary light emission and a luminance after the preliminary light emission in a region around the main subject region detected by the main subject detecting section 1123 (step S201). The luminance difference is extracted as, for example, the difference of each pixel of the image data obtained before and after the preliminary light emission. After the extraction of the luminance difference, the background color setting section 1125 determines whether or not the luminance difference before and after the preliminary light emission in the region around the main subject region is a predetermined value or less (step S202). When it is determined in the step S202 that the luminance difference is equal to or less than the predetermined value, the background color setting section 1125 determines that a composition is OK (step S203). Afterward, the processing of FIG. 4 ends. The state where "the composition is OK" in the present embodiment is a state where a background subject reflecting the illumination light is not present around a main subject region S as shown in FIG. 5A. When a background subject is not present, the illumination light is not reflected, and hence the luminance does not change before and after the preliminary light emission. When it is determined in the step S202 that the luminance difference is in excess of the predetermined value, the background color setting section 1125 determines that the composition is NG (step S204). Afterward, the background color setting section 1125 ends the processing of FIG. 4. The state where "the composition is NG" in the present embodiment is a state where a background subject B reflecting the illumination light is present around the main subject region S as shown in FIG. 5B. When the background subject B is present, the illumination light is reflected, hence the luminance changes before and after the preliminary light emission.

Here, the description is returned to that of FIG. 2. After the composition determination processing, the background color setting section 1125 determines whether or not the composition is OK as the result of the composition determination processing (step S108). When it is determined in the step S108 that the composition is OK, the background color setting section 1125 performs blue background/black background exposure control processing together with the exposure control section 1126 (step S109). Hereinafter, the blue background/black background exposure control processing will be described in detail.

Figure 6:
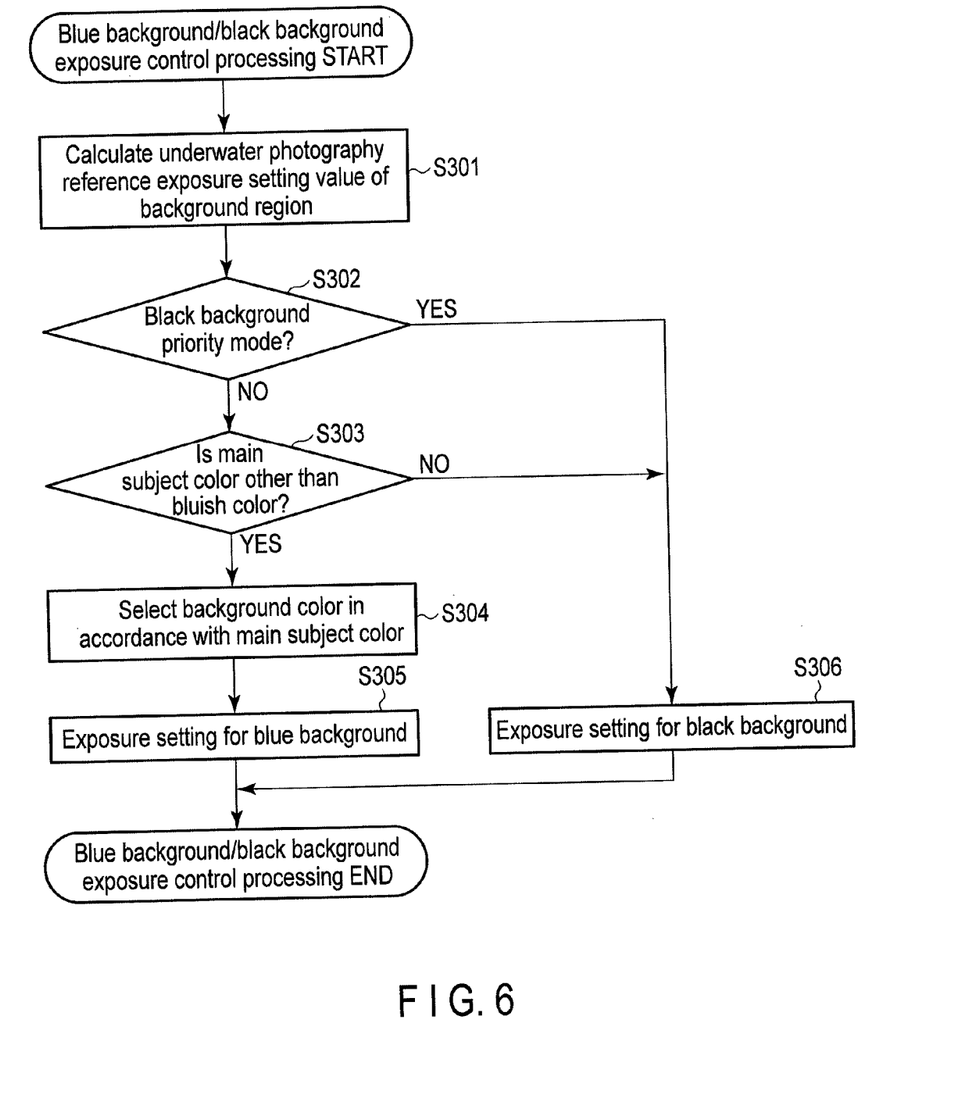
FIG. 6 is a flowchart showing blue background/black background exposure control processing.

FIG. 6 is a flowchart showing the blue background/black background exposure control processing. In FIG. 6, the exposure control section 1126 calculates an underwater photography reference exposure setting value of the background region (step S301). The underwater photography reference exposure setting value of the background region is the exposure setting value (the aperture value Av and the shutter speed Tv) required so that the exposure of the background region during the underwater photography is set to the predetermined appropriate value in the imaging device 100. The underwater photography reference exposure setting value of the background region is calculated in accordance with, for example, AE computation similar to a conventional computation on the basis of the luminance of the background region (the value of the image data).

After the calculation of the underwater photography reference exposure setting value of the background region, the background color setting section 1125 determines whether or not the present mode of the underwater photography mode is the black background priority mode (step S302). When it is determined in the step S302 that the mode of the underwater photography is not the black background priority mode, the background color setting section 1125 determines whether or not the color of the main subject region is a color other than the bluish color (step S303). When it is determined in the step S303 that the color of the main subject region is a color other than the bluish color (i.e., is a the reddish color, yellowish color, greenish color or purplish color), the background color setting section 1125 sets the color of the background region in accordance with the color of the main subject region (step S304). Then, the exposure control section 1126 sets the exposure setting to that for a blue background (step S305). The processing of FIG. 6 then ends. Hereinafter, the processing of the step S304 and the step S305 will be described in detail.

Figure 7A:
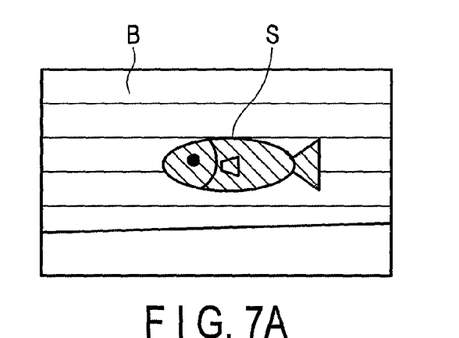
FIG. 7A, FIG. 7B, FIG. 7C and FIG. 7D are views to explain setting of a color of a background region.
Figure 7B:
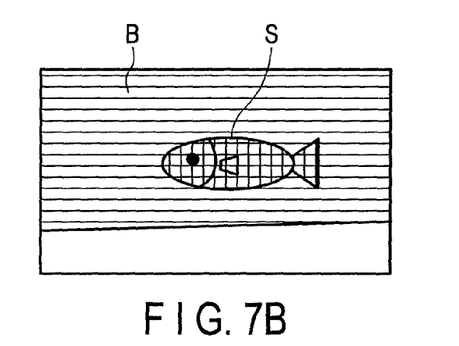
Figure 7C:
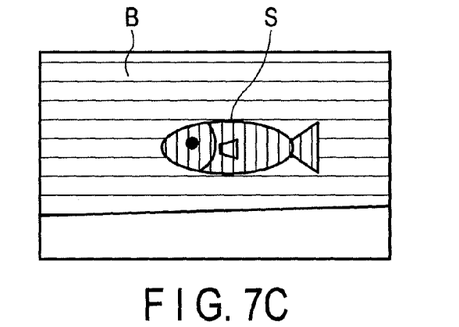

First, the setting of the color of the background region of the step S304 is described. A deepness of the color of the background region is basically set so that a blue background effect can be obtained, i.e., so that the color of the main subject region stands out. For example, when the color of the main subject region is the purplish color or the greenish color (in the case of a color close to the bluish color in the hue circle shown in FIG. 3), as shown in FIG. 7A, the color of the background region is set to a light bluish color, so that the color of the main subject region stands out against the blue color of the background region. Furthermore, when the color of the main subject region is the yellowish color (in the case of a color away from the bluish color in the hue circle shown in FIG. 3), as shown in FIG. 7B, the color of the background region is set to a deep bluish color, so that the color of the main subject region stands out against the blue color of the background region. Furthermore, when the color of the main subject region is the reddish color, as shown in FIG. 7C, the color of the background region is set to a color of an intermediate deepness between the color of the background region when the color of the background region is the purplish color and the color of the background region when the color of the background region is the yellowish color, so that the color of the main subject region stands out against the blue color of the background region.

Next, the exposure setting for blue background of the step S305 will be described. The exposure setting for blue background is the setting of the exposure setting value in which the color of the background region is set to such a color as set in the step S304. As described above, for example, when the color of the main subject region is the purplish color or the greenish color, the color of the background region is set to a light bluish color. Therefore, in the present embodiment, the exposure setting value is set to an overexposure side from the underwater photography reference exposure setting value. That is, the exposure setting value is set to the overexposure side from the underwater photography reference exposure setting value to brighten the background region, thereby lightening the color of the background region in the image data. Furthermore, when the color of the main subject region is the yellowish color, the color of the background region is set to a deep bluish color.

Therefore, in the present embodiment, the exposure setting value is set to an underexposure side from the underwater photography reference exposure setting value. That is, the exposure setting value is set to the underexposure side from the underwater photography reference exposure setting value to darken the background region, thereby deepening the color of the background region in the image data. It is to be noted that, for example, a regulation amount of the exposure setting value to the underwater photography reference exposure setting value is beforehand set for each color of the main subject region. The regulation amount of the exposure setting value may be determined upon photography.

Figure 7D:
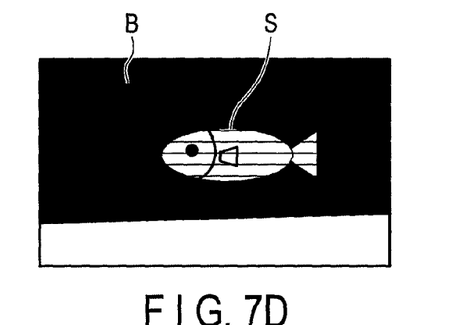

In the step S302, when it is determined that the mode of the underwater photography is the black background priority mode or when it is determined that the color of the main subject region is the bluish color, the exposure control section 1126 sets the exposure setting to that for black background (step S306). Afterward, the processing of FIG. 6 ends. The exposure setting for black background is the setting of the exposure setting value in which the color of the background region is set to black. Here, the exposure setting value to set the background region to black is, for example, the lowest exposure value predetermined in the imaging device 100. When the main subject has the bluish color and when the color of the background region is also the bluish color, the color of the main subject does not stand out. Therefore, as shown in FIG. 7D, the color of the background region is set to black (i.e., the background region is set to the lowest luminance), thereby allowing the color of the main subject region to stand out.

Here, the description is returned to that of FIG. 2 again. After the blue background/black background exposure control processing, the dimming control section 1127 performs dimming of the illuminating section 108 by use of the luminance of the main subject region as a reference (step S110). That is, the dimming control section 1127 determines the amount of the light to be emitted by the illuminating section 108 (the dimming level) which is required so that the exposure of the main subject region is set to the predetermined appropriate value, on the basis of the image data obtained as the result of the preliminary light emission. Then, the exposure control section 1126 performs dimming limit time exposure control processing together with the dimming control section 1127 (step S111). Hereinafter, the dimming limit time exposure control processing will be described in detail.

Figure 8:
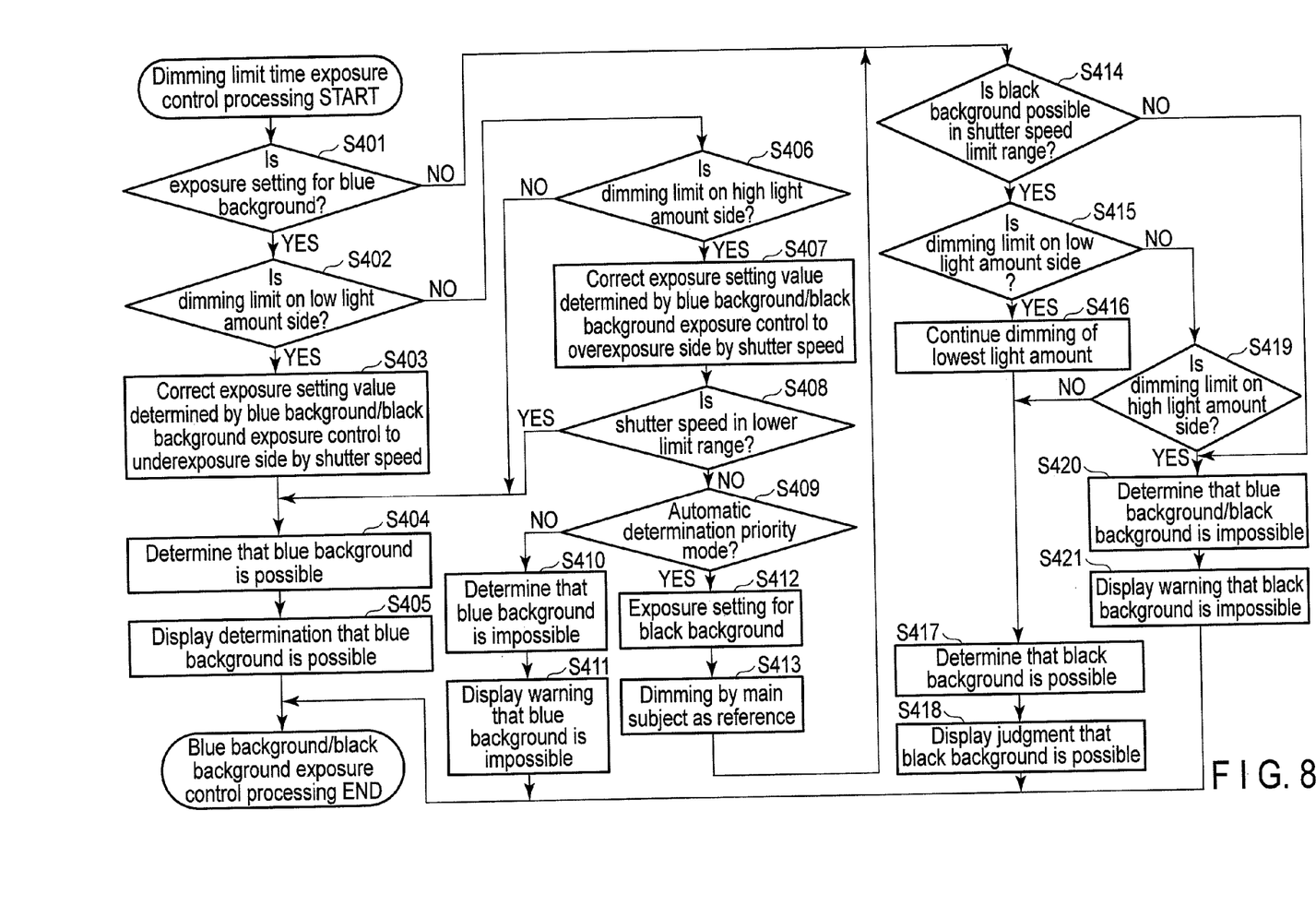
FIG. 8 is a flowchart showing dimming limit time exposure control processing.

FIG. 8 is a flowchart showing the dimming limit time exposure control processing. In FIG. 8, the exposure control section 1126 determines whether or not the present exposure setting is the exposure setting for blue background (step S401). When the exposure control section 1126 determines in the step S401 that the present exposure setting is the exposure setting for blue background, the dimming control section 1127 determines whether or not the amount of the light to be emitted, which is calculated as the result of the dimming, is smaller than a limit (the lowest light amount) on a low light amount side which is predetermined by the illuminating section 108 (step S402). When the dimming control section 1127 determines in the step S402 that the amount of the light to be emitted is smaller than the limit on the low light amount side which is predetermined in the illuminating section 108, the exposure control section 1126 corrects the shutter speed to a further underexposure side from the exposure setting value set as the exposure setting for blue background in the blue background/black background exposure control processing (step S403). In the case of the step S403, it is meant that the main subject region is overexposed even when the light emission of the illuminating section 108 is not performed. In this case, the shutter speed is increased as the exposure setting value to appropriately expose the main subject region. That is, the corrected shutter speed is Tv+ΔTv, where Tv is the shutter speed set as the exposure setting for blue background and ΔTv is a corrected value of the shutter speed. ΔTv is set in accordance with the luminance of the main subject region and the color of the background region. That is, the shutter speed is set to such a degree that the effect of the blue background can be obtained and to such a degree that the exposure of the main subject region is nearly appropriate. In the step S403, the shutter speed is increased to set the exposure to underexposure. On the other hand, a sensitivity of an imaging element is lowered, so that the exposure of the main subject region can be set to underexposure.

After the exposure setting value is regulated, the exposure control section 1126 determines that blue background photography is possible (step S404). At this time, the exposure control section 1126 notifies the photography control section 1128 that blue background photography is possible. Upon receiving this notification, the photography control section 1128 notifies the user that blue background photography is possible, for example, by display in the display section 104 (step S405). Afterward, the processing of FIG. 8 ends.

When it is determined in the step S402 that the amount of light to be emitted is the predetermined limit or more on the low light amount side which is predetermined in the illuminating section 108, the dimming control section 1127 determines whether or not the amount of light to be emitted which is calculated as the result of the dimming is in excess of a limit on a high light amount side which is predetermined in the illuminating section 108 (step S406). When the dimming control section 1127 determines in the step S406 that the amount of the light to be emitted is in excess of the limit on the high light amount side which is predetermined in the illuminating section 108, the exposure control section 1126 corrects the shutter speed to a further overexposure side from the exposure setting value set as the exposure setting for blue background in the blue background/black background exposure control processing (step S407). In the case of the step S407, it is meant that the main subject region is underexposed, even when the light emission of the illuminating section 108 is performed. In this case, the shutter speed as the exposure setting value is decreased to appropriately expose the main subject region. That is, the corrected shutter speed is Tv−ΔTv, where Tv is the shutter speed set as the exposure setting for blue background, and ΔTv is the corrected value of the shutter speed. ΔTv is set in accordance with the luminance of the main subject region and the color of the background region. That is, the shutter speed is set to such a degree that the effect of the blue background can be obtained and to such a degree that the exposure of the main subject region is nearly appropriate. Here, in the step S407, the shutter speed is decreased to set the exposure to overexposure. On the other hand, the sensitivity of the imaging element is heightened, so that the exposure of the main subject region can also be set to overexposure.

Subsequently, the exposure control section 1126 determines whether or not the corrected shutter speed is a lower limit or more which is preset in the imaging device 100 (step S408). The lower limit of the shutter speed is, for example, a value of such a degree that picture blur is generated during the photography. In actuality, the shutter speed at which the picture blur is generated varies in accordance with a focal distance of the photography optical system. Here, as described above, underexposure can be corrected not only by decreasing the shutter speed but also by heightening the sensitivity of the imaging element. Therefore, the determination in the step S408 may also take into consideration the correction by the regulation of the sensitivity of the imaging element. That is, even when the shutter speed is the lower limit, the determination of the step S408 may be branched to YES within a range in which the underexposure can be corrected by regulating the sensitivity of the imaging element. When the exposure control section 1126 determines in the step S408 that the corrected shutter speed is the lower limit or more which is preset in the imaging device 100, the processing shifts to the step S404. In this case, it is determined that blue background photography is possible.

When it is determined in the step S408 that the corrected shutter speed is below the lower limit preset in the imaging device 100, the exposure control section 1126 determines whether or not the present underwater photography mode is the blue background/black background automatic determination priority mode (step S409). When it is determined in the step S409 that the present underwater photography mode is not the blue background/black background automatic determination priority mode, i.e., that the present underwater photography mode is the blue background priority mode, the exposure control section 1126 determines that the blue background photography is impossible (step S410). At this time, the exposure control section 1126 notifies the photography control section 1128 that the blue background photography is impossible. Upon receiving this notification, the photography control section 1128 notifies the user of the warning indicating that the blue background photography is impossible, for example, by the display in the display section 104 (step S411). Afterward, the processing of FIG. 8 ends.

When it is determined in the step S409 that the present underwater photography mode is the blue background/black background automatic determination priority mode, the exposure control section 1126 changes the exposure setting to the exposure setting for black background (step S412). Subsequently, the dimming control section 1127 performs the dimming of the illuminating section 108 by use of the luminance of the main subject region as the reference (step S413). Afterward, the processing shifts to step S414.

When it is determined after the step S413 or in the step S401 that the present exposure setting is not the exposure setting for blue background, the exposure control section 1126 determines whether or not the black background photography is possible in a limit range of the shutter speed which is preset in the imaging device 100 (the step S414). In the step S414, it is determined whether or not the background region can be set to the lowest luminance at the shutter speed of the shutter speed upper limit or less which is preset in the imaging device 100. Here, when a tuning limit shutter speed to the illuminating section 108 is determined, this tuning limit shutter speed becomes the upper limit of the shutter speed. When the exposure control section 1126 determines in the step S414 that the black background photography is possible within the limit range of the shutter speed preset in the imaging device 100, the dimming control section 1127 determines whether or not the amount of the light to be emitted which is calculated as the result of the dimming is the limit (the lowest light amount) or less on the low light amount side which is predetermined in the illuminating section 108 (step S415). When it is determined in the step S415 that the amount of the light to be emitted is equal to or less than the limit on the low light amount side which is predetermined in the illuminating section 108, the dimming control section 1127 sets the amount of the light to be emitted by the illuminating section 108 to the lowest light amount (step S416).

After the dimming is performed, the exposure control section 1126 determines that the black background photography is possible (step S417). At this time, the exposure control section 1126 notifies the photography control section 1128 that the black background photography is possible. Upon receiving this notification, the photography control section 1128 notifies the user that the black background photography is possible, for example, by the display in the display section 104 (step S418). Afterward, the processing of FIG. 8 ends.

When it is determined in the step S415 that the amount of the light to be emitted is in excess of the limit on the low light amount side which is predetermined in the illuminating section 108, the dimming control section 1127 determines whether or not the amount of the light to be emitted which is calculated as the result of the dimming is in excess of the limit on the high light amount side which is predetermined in the illuminating section 108 (step S419). When the dimming control section 1127 determines in the step S419 that the amount of the light to be emitted is not in excess of the limit on the high light amount side which is predetermined in the illuminating section 108, the processing shifts to the step S417. In this case, it is determined that the black background photography is possible.

When the dimming control section 1127 determines in the step S419 that the amount of the light to be emitted is in excess of the limit on the high light amount side which is predetermined in the illuminating section 108, the exposure control section 1126 determines that both the blue background photography and the black background photography are impossible (step S420). At this time, the exposure control section 1126 notifies the photography control section 1128 that both the blue background photography and the black background photography are impossible. Upon receiving this notification, the photography control section 1128 notifies the user of the warning indicating that the black background photography is impossible, for example, by the display in the display section 104 (step S421). Afterward, the processing of FIG. 8 ends. In the case of the black background photography, even when the underexposure of the main subject is corrected by the shutter speed or the sensitivity of the imaging element, the main subject region will not stand out. Therefore, when underexposure of the main subject takes place even when light emission of the illuminating section 108 occurs, it is determined that the black background photography is impossible. Here, when the mode of the underwater photography is the blue background/black background automatic determination priority mode, the photography control section 1128 notifies the user of the warning indicating that both the blue background photography and the black background photography are impossible by the display in the display section 104.

Here, the description is returned to that of FIG. 2 again. After the dimming limit time exposure control processing, the photography control section 1128 determines whether or not the exposure control section 1126 determines that the blue background photography or the black background photography is possible (step S112). When it is determined in the step S112 that blue background photography or black background photography is possible, the photography control section 1128 determines whether or not the user performs the second release operation (step S113). The determination of the step S113 is repeated until it is determined in the step S113 that the second release operation is performed.

When it is determined in the step S113 that the second release operation is performed, the photography control section 1128 carries out the blue background photography or the black background photography (step S114). That is, when it is determined that the blue background photography is possible, the photography control section 1128 carries out the blue background photography, and when it is determined that the black background photography is possible, the photography control section 1128 carries out the black background photography. Hereinafter, the blue background photography and the black background photography will be described.

Figure 9A:
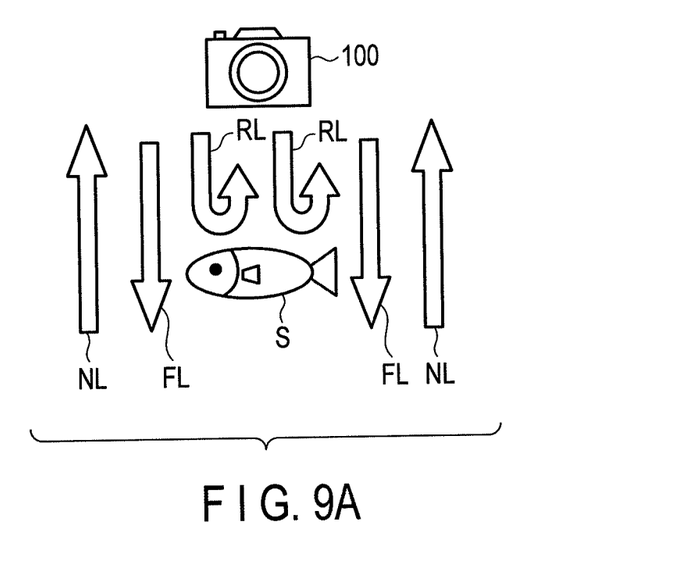
FIG. 9A is a view showing blue background photography.

In the blue background photography, the photography control section 1128 controls the exposure control section 1126 to control a main imaging operation of the imaging section 102 in accordance with the exposure setting value (the aperture value Av and the shutter speed Tv) which is set as the exposure setting for blue background, while controlling the dimming control section 1127 synchronously with this imaging operation of the imaging section 102, thereby allowing the illuminating section 108 to emit the light. The image data obtained as the result of the imaging operation is processed in the image processing portion 1128a. Then, the image file is generated from the image data obtained by the image processing, and this image file is recorded in the recording section 106. In such blue background photography, as shown in FIG. 9A, a main subject region S reflects illumination light FL from the illuminating section 108. Therefore, a color of reflected light RL from the main subject region S is influenced by a color of the illumination light FL. However, when the illumination light FL is white light, brightness of the main subject region S is emphasized. On the other hand, a background region B does not reflect the illumination light FL from the illuminating section 108. Therefore, the light from the background region B is only made of components of natural light. When the background region is water as in the present embodiment, a color component of the light from the background region is a bluish color. Here, in the present embodiment, the exposure setting value is set so that the color (the bluish color) of the background region B turns to the bluish color of a specific deepness. In this way, the color of the main subject region S is emphasized against the bluish color of the background region B.

Figure 9B:
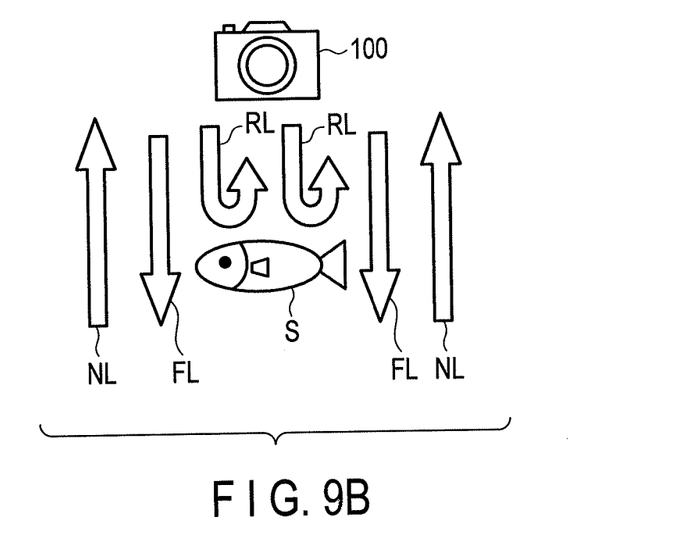
FIG. 9B is a view showing black background photography.

In the black background photography, the photography control section 1128 controls the exposure control section 1126 to perform the main imaging operation by the imaging element of the imaging section 102 in accordance with the exposure setting value (the aperture value Av and the shutter speed Tv) which is set as the exposure setting for black background, while controlling the dimming control section 1127 synchronously with the imaging operation of the imaging section 102, thereby allowing the illuminating section 108 to emit the light. The image data obtained as the result of the imaging operation is processed in the image processing portion 1128a. Then, the image file is generated from the image data obtained by the image processing, and this image file is recorded in the recording section 106. In such black background photography, as shown in FIG. 9B, the main subject region S reflects the illumination light FL from the illuminating section 108. Therefore, the color of the reflected light RL from the main subject region S is influenced by the color of the illumination light FL. Furthermore, similarly to the blue background photography, the light from the background region B is only made of the components of natural light. However, in the exposure setting for black background, the exposure setting value is set so that the background region B is extremely underexposed. In this way, the color of the main subject region S is emphasized against a blackish color of the background region B.

Here, the description is returned to that of FIG. 2 again. After the blue background photography or the black background photography is carried out, the photography control section 1128 records history information of the performed photography mode as, for example, Exif information in a header of the image file (step S115). Thereafter, the processing of FIG. 2 ends. The history information of the photography mode is, for example, information indicating whether the photography mode was the usual photography mode or the underwater photography mode, or information indicating whether the blue background photography or the black background photography was carried out in the underwater photography mode.

When it is determined in the step S108 that the composition is not OK, i.e., the composition is NG, the background color setting section 1125 notifies the photography control section 1128 that the composition is NG. Upon receiving this notification, the photography control section 1128 notifies the user that the composition is not suitable for carrying out the blue background photography or the black background photography (the composition is NG), for example, by the display in the display section 104 (step S116).

After it is notified that the composition is NG or when it is determined in the step S112 that the blue background photography or the black background photography is not possible, the photography control section 1128 determines whether or not the user performs the second release operation (step S117). The determination of the step S117 is repeated until it is determined in the step S117 that the second release operation is performed.

When it is determined in the step S117 that the second release operation is performed, the photography control section 1128 carries out usual underwater photography (step S118). Afterward, the processing shifts to the step S115. The usual underwater photography may basically be similar to an operation after the second release operation is performed in the usual photography mode.

As described above, according to the present embodiment, such a color of the background region as to emphasize the color of the main subject region is determined in accordance with the color of the main subject region, and the exposure setting is performed to obtain this determined color of the background region. In consequence, the user can carry out the photography to emphasize a desirable color of the main subject without performing any complex operations. Especially, in the case of underwater photography, blue background photography and black background photography are automatically selectively used in accordance with the color of the main subject region.

Furthermore, the dimming is also controlled in addition to the exposure setting, so that it is possible to further enhance the effect of emphasizing the color of the main subject region against the color of the background region. Furthermore, the exposure setting and the dimming are simultaneously controlled, thereby enabling regulations such as correction of underexposure by increasing the amount of light to be emitted by the illuminating section 108, and the setting of the exposure to underexposure in a case where the main subject region is excessively exposed.

In the above embodiment, the underwater photography mode is illustrated as the photography mode in which blue background photography is carried out. However, the technology of the present embodiment can be applied to each type of photography mode in which the blue background photography can be carried out.

Furthermore, each process carried out in the abovementioned embodiment can be previously stored as a program which can be executed by the control unit 112. Additionally, the processing can be stored and distributed in a storage medium of an external storage device, for example, a memory card (a ROM card, a RAM card or the like), a magnetic disk (a floppy disk, a hard disk or the like), an optical disc (a CD-ROM, a DVD or the like), or a semiconductor memory. Then, the control unit 112 reads the program stored in this storage medium of the external storage device, and the operation of the control unit is controlled by this read program, so that it is possible to execute the abovementioned processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
an imaging section which images a subject to obtain image data;
a main subject detecting section which detects a region of a main subject in the image data;
a main subject color determining section which determines a color of the region of the main subject;
a background color setting section which sets a color of a region that becomes a background of the region of the main subject;
an exposure control section which sets an exposure setting value in accordance with the color of the region that becomes the background; and
a photography control section which controls main imaging by the imaging section in accordance with the exposure setting value;
wherein the background color setting section sets, to a black color, the color of the region that becomes the background, and
the exposure control section sets the exposure setting value to a lowest value so that the region of the background turns to the black color.

2. An imaging device comprising:
an imaging section which images a subject to obtain image data;
a main subject detecting section which detects a region of a main subject in the image data;
a main subject color determining section which determines a color of the region of the main subject;
a background color setting section which sets a color of a region that becomes a background of the region of the main subject;
an exposure control section which sets an exposure setting value in accordance with the color of the region that becomes the background;
a photography control section which controls main imaging by the imaging section in accordance with the exposure setting value;
an illuminating section which illuminates the main subject; and
a dimming control section which causes the illuminating unit to perform preliminary light emission and determines an amount of light to be emitted by the illuminating unit during main imaging,
wherein the background color setting section determines a composition by comparing an image data acquired by the preliminary light emission with an image data acquired without the preliminary light emission, and notifies that the main imaging is impossible when the composition is not suitable for photography.

3. The imaging device of claim 1, wherein the background color setting section sets, to the black color, the color of the region that becomes the background, by an instruction of a user.

* * * * *